United States Patent
Li et al.

(10) Patent No.: US 10,404,810 B2
(45) Date of Patent: Sep. 3, 2019

(54) SESSION LAYER COMMUNICATIONS USING AN ID-ORIENTED NETWORK

(71) Applicant: Futurewei Technologies, Inc., Plano, TX (US)

(72) Inventors: Renwei Li, Sunnyvale, CA (US); Kiran Makhijani, Los Gatos, CA (US)

(73) Assignee: Futurewei Technologies, Inc., Plano, TX (US)

( * ) Notice: Subject to any disclaimer, the term of this patent is extended or adjusted under 35 U.S.C. 154(b) by 240 days.

(21) Appl. No.: 15/628,410

(22) Filed: Jun. 20, 2017

(65) Prior Publication Data

US 2018/0367620 A1 Dec. 20, 2018

(51) Int. Cl.
*H04L 29/08* (2006.01)

(52) U.S. Cl.
CPC .......... *H04L 67/147* (2013.01); *H04L 67/141* (2013.01); *H04L 69/327* (2013.01)

(58) Field of Classification Search
CPC ....... H04L 69/16; H04L 69/161; H04L 69/22; H04L 29/06; H04L 49/90; H04L 69/12; H04L 67/14; H04L 67/327; H04L 69/32; H04L 63/1408; H04L 49/901; H04L 63/20; H04L 67/142; H04L 67/325; H04Q 2213/13093; H04Q 2213/13103; H04Q 2213/13204; H04Q 2213/13299; H04Q 2213/1332

See application file for complete search history.

(56) References Cited

U.S. PATENT DOCUMENTS

| | | | |
|---|---|---|---|
| 7,206,805 B1 * | 4/2007 | McLaughlin, Jr. | G06F 9/466 707/999.01 |
| 7,290,056 B1 * | 10/2007 | McLaughlin, Jr. | H04L 43/0852 709/201 |
| 9,319,230 B2 * | 4/2016 | Kotecha | H04L 12/189 |
| 9,503,865 B2 * | 11/2016 | Kotecha | H04L 12/189 |
| 10,243,718 B2 * | 3/2019 | Hong | H04L 5/1423 |
| 2011/0289222 A1 | 11/2011 | Scheibel et al. | |
| 2013/0215805 A1 * | 8/2013 | Hong | H04B 15/00 370/281 |
| 2014/0280813 A1 * | 9/2014 | Ramachandran | H04L 67/14 709/223 |

(Continued)

FOREIGN PATENT DOCUMENTS

| | | |
|---|---|---|
| CN | 102202061 A | 9/2011 |
| WO | 2011119793 A2 | 9/2011 |
| WO | 2012018748 A1 | 2/2012 |

OTHER PUBLICATIONS

Foreign Communication From a Counterpart Application, PCT Application No. PCT/CN2018/090183, English Translation of International Search Report dated Aug. 1, 2018, 4 pages.

(Continued)

*Primary Examiner* — Ninos Donabed
(74) *Attorney, Agent, or Firm* — Conley Rose, P.C.

(57) ABSTRACT

Systems and methods for providing a session layer connection between two or more network endpoints. Session layer connections created and maintained using embodiments of the present disclosure use endpoint identifiers (EIDs) and allow for session layer continuity when a lower-layer connection is broken because of network failures or the movement of an endpoint from one network connection to another.

10 Claims, 8 Drawing Sheets

(56) References Cited

U.S. PATENT DOCUMENTS

| | | | | |
|---|---|---|---|---|
| 2014/0348018 | A1* | 11/2014 | Bharadia | H04L 5/1461 370/252 |
| 2015/0229486 | A1* | 8/2015 | Kotecha | H04L 12/189 370/312 |
| 2016/0212725 | A1* | 7/2016 | Qiu | H04W 68/005 |
| 2016/0226653 | A1* | 8/2016 | Bharadia | H04B 1/525 |
| 2017/0012778 | A1 | 1/2017 | Choyi et al. | |

OTHER PUBLICATIONS

Pillay-Esnault, P., "Identity Oriented Networking and Ubiquitous Mobility for IP 2020," May 2016, 36 pages.

Ren, S., et al., "A ID/Locator Separation Prototype Using Drone for Future Network," CTRQ, The Tenth International Conference on Communication Theory, Reliability, and Quality of Service, 2017, pp. 25-28.

Da, B., et al., "Cross-Silo and Cross-Eco IoT Communications with ID Oriented Networking (ION)," CTRQ, The Tenth International Conference on Communication Theory, Reliability, and Quality of Service, pp. 35-40.

"Information technology—Open Systems Interconnection—Basic Reference Model: The Basic Model," ISO/IEC, 7498-1, Jun. 15, 1996, 68 pages.

"Internet Protocol, Darpa Internet Program, Protocol Specification," RFC 791, Sep. 1981, 50 pages.

"Transmission Control Protocol, Darpa Internet Program, Protocol Specification," RFC 793, Sep. 1981, 90 pages.

Farinacci, D., et al., "The Locator/ID Separation Protocol (LISP)," RFC 6830, Jan. 2013, 75 pages.

Moskowitz, R., Ed., et al., "Host Identity Protocol Version 2 (HIPv2)," RFC 7401, Apr. 2015, 128 pages.

Makhijani, Kiran, U.S. Appl. No. 62/421,015; Title: "Method to Optimize Mapping for Multiple Locations of a Device in Mobility"; filed Nov. 11, 2016.

* cited by examiner

SESSION LAYER COMMUNICATIONS USING AN ID-ORIENTED NETWORK

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The transmission control protocol/Internet protocol (TCP/IP) is the protocol of the public internet (i.e., the "Internet"). However, as can been seen in FIG. 1, which shows a rough comparison between OSI Reference Model 100 and TCP/IP stack conventional TCP/IP stack, TCP/IP lacks a "session layer," which provides the means necessary for cooperating computers to organize and to synchronize their dialogue and to manage their data exchange. Because the conventional TCP/IP stack lacks a formal session layer, the applications themselves are responsible for maintaining their connections and performing any resynchronization required following breaks in the underlying connections.

SUMMARY

The embodiments of this disclosure are directed at creating and maintaining session layer connections over a conventional TCP/IP-based network.

In a first embodiment, a method for a first network element with a first endpoint identifier (EID) establishes a session layer connection with a second network element identified by a second EID comprises receiving a request from an application layer to listen for a session layer connection request, wherein the application layer is associated with the first network element, instructing a transport layer to listen for a request for a new transport layer connection, wherein the transport layer is associated with the first network element, receiving a first transport layer connection request from the second network element, wherein the transport layer connection request comprises a first IP address, establishing a first transport layer connection with the second network element, receiving a first session layer connection request from the second network element, wherein the first session layer connection request comprises a session identifier (ID) and the second EID, and establishing a session layer connection with the second network element.

In a variation on the first embodiment, establishing the session layer may comprise sending a session layer confirmation message to the second network element via the transport layer connection. In a variation on the first embodiment, establishing the session layer connection may comprise receiving credential information from the second network element via the transport layer connection, and authenticating the credential information. In a variation on the first embodiment, the method may further comprise receiving a first plurality of session layer messages from the second network element via the session layer connection, forwarding the first plurality of session layer messages to the application layer, receiving a second plurality of session layer messages from the application layer with instructions to send the second plurality of session layer messages to the second network element, and sending the second plurality of session layer messages to the second network element via the session layer connection. This variation may further comprise maintaining a local message sequence number associated with the session layer connection, inserting the local message sequence number into each of the second plurality of session layer messages, incrementing the local message sequence number after sending each session layer message, maintaining a local message acknowledgement number associated with the session layer connection, and updating the local message acknowledgement number according to a received message acknowledgement number extracted from each of the first plurality of session layer messages. This variation may further comprise receiving a second transport layer connection request from the second network element, wherein the second transport layer connection request comprises the first IP address, establishing a second transport layer connection with the second network element, receiving a second session layer resynchronization request from the second network element, wherein the second session layer resynchronization request may comprise the session ID and the second EID, and reestablishing the session layer connection with the second network element; and resynchronizing the session layer connection according to the local message sequence number and the local message acknowledgement number. This variation may further comprise receiving a second transport layer connection request from the second network element, wherein the second transport layer connection request may comprise a second IP address, establishing a second transport layer connection with the second network element, receiving a second session layer resynchronization request from the second network element, wherein the second session layer resynchronization request may comprise the session ID and the second EID, reestablishing the session layer connection with the second network element; and resynchronizing the session layer connection according to the local message sequence number and the local message acknowledgement number. In a further variation, each of the first plurality of session layer messages may comprise a session header and wherein the session header may comprise the session ID, the first EID, the second EID, a message sequence number and a message acknowledgement number.

In a second embodiment, a first network element identified by a first EID establishes a session layer connection with a second network element identified by a second EID by receiving a request from an application layer to establish a new session layer connection, wherein the request comprises the second EID and wherein the application layer is associated with the first network element, translating the second EID into a second IP address associated with the second network element, generating a session ID, wherein the session ID uniquely identifies the session layer connection, instructing a transport layer to establish a transport layer connection with the second network element according to a first IP address identifying the first network element and the second IP address, wherein the transport layer is associated with the first network element, and establishing the session layer connection with the second network element using the transport layer connection and the session D.

In a variation on the second embodiment, translating the second EID into the second IP address may comprise sending a request message to a mapping system, wherein the request message comprises the second EID, and receiving a response message from the mapping system, wherein the response message comprises the second IP address.

In a variation on the second embodiment, the method may further comprise receiving a first plurality of session layer messages from the second network element via the session layer connection, forwarding the first plurality of session layer messages to the application layer, receiving a second plurality of session layer messages from the application layer with instructions to send the second plurality of session layer messages to the second network element, and sending the second plurality of session layer messages to the second network element via the session layer connection. This variation may further comprise maintaining a local message sequence number associated with the session layer connection, inserting the local message sequence number into each of the second plurality of session layer messages, incrementing the message sequence number after sending each session layer message, maintaining a local message acknowledgement number associated with the session layer connection, and updating the local message acknowledgement number according to a received message acknowledgement number extracted from each of the first plurality of session layer messages. This variation may further comprise identifying a break in the transport layer connection, reestablishing the transport layer connection with the second network element, receiving a new session layer message from the second network element, and resynchronizing the session layer connection according to the local message sequence number and the local message acknowledgement number. In a variation on this embodiment, each of the first plurality of session layer messages comprises a session header and wherein the session header comprises the session ID, the first EID, the second EID, a message sequence number and a message acknowledgement number.

In a second embodiment, a first network element identified by a first endpoint identifier (EID) comprises a memory for storing programming logic to implement an application layer, a session layer, a transport layer, a network layer, and a network access layer, a network interface coupled with a second network element via an internet, and a processor coupled to the memory and the network interface. The processor is configured to receive a request from the application layer to listen for a session layer connection request, instruct the transport layer to listen for a request for a new transport layer connection, receive a transport layer connection request, via the network interface, from the second network element identified by a second EID, establish a transport layer connection, via the network interface, with the second network element, receive a session layer connection request, via the network interface, from the second network element, wherein the session layer connection request comprises a session ID, and establish a session layer connection, via the network interface, with the second network element.

In a variation on the third embodiment, each of the first plurality of session layer messages may comprise a session header and wherein the session header comprises the session ID, the first ED, the second EID, a message sequence number and a message acknowledgement number. In this variation, the processor may be configured to receive a first plurality of session layer messages from the second network element via the session layer connection, forward the first plurality of session layer messages to the application layer, receive a second plurality of session layer messages from the application layer with instructions to send the second plurality of session layer messages to the second network element, and send the second plurality of session layer messages to the second network element via the session layer connection. In this variation, the memory may comprise a local message sequence number and a local message acknowledgement number and the processor is may be configured to insert the local message sequence number into each of the second plurality of session layer messages, increment the local message sequence number after sending each session layer message, and update the local message acknowledgement number according to a receive message acknowledgement number extracted from each of the first plurality of session layer messages. In this variation, the processor may be configured to receive a second transport layer connection request from the second network element, wherein the second transport layer connection request comprises a first IP address, establish a second transport layer connection with the second network element, receive a second session layer resynchronization request from the second network element, wherein the second session layer resynchronization request comprises the session ID and the second EID, reestablish the session layer connection with the second network element, and resynchronize the session layer connection according to the local message sequence number and the local message acknowledgement number. In this variation, the processor may be configured to receive a second transport layer connection request from the second network element, wherein the second transport layer resynchronization request comprises a second internet protocol (IP) address, establish a second transport layer connection with the second network element, receive a second session layer resynchronization request from the second network element, wherein the second session layer connection request comprises the session ID and the second EID, reestablish the session layer connection with the second network element, and resynchronize the session layer connection according to the local message sequence number and the local message acknowledgement number.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Embodiments of the present disclosure describe a session layer that can operate over a conventional network such as TCP/IP. The disclosed embodiments separate the implementation details of the conventional network from the application layer and insulate the application layer from disruptions of the underlying connection caused by physical breaks and by changes to network addresses. For example, mobile devices, by their very nature, move from one location to another, and when they move, their network addresses may changes. With traditional TCP/IP, after a change of its network address, a mobile device must re-establish a connection and the previous connection—including connection state, data, authentication, and so on—is lost. Using embodiments of the present disclosure, applications retain the connection state, data, authentication, and so on, even when network addresses or transport layer connections have changed.

More particularly, embodiments of the present disclosure may create and use a stateful session layer positioned above the conventional TCP/IP transport layer. Further, by using a generalized session protocol and primitives, embodiments of the present disclosure may decouple session management functions and transport layer implementation details from the application layer. Further, embodiments of the present disclosure may use the framework of an identity-oriented network (ION) such as that described in "A ID/Locator Separation Prototype Using Drone for Future Network" and "Cross-Silo and Cross-Eco IoT Communications with ID Oriented Networking (ION)" (both presented at the Tenth International Conference on Communication Theory, Reliability, and Quality of Service, Apr. 23-27, 2017). ION follows the idea of identifier (ID) and locator namespace split. The traditional IP address assumes overloaded semantics of being both endpoint identifier and routing locator. In literature, several proposals have been formulated to decouple the IP into two layers, which contributes to ID and IP layers. The IP layer aligns with the successful internet practices to establish global reachability while ID layer performs functions essential for an endpoint's identity. The ID layer in ION framework has two components: Network Mapping System (NMS) for translating ID to locator whenever queried and ID Management System (IDMS) for centralized or distributed management of universal identifiers. In embodiments of the present disclosure, an endpoint ID (ED) may be defined according to a service, and as such, be decoupled an endpoint from its IP address. In order to exchange data between 2 entities using ID-ID communication in ION, the locators of an endpoint identity is resolved locator using a mapping system. Thus, by creating a stateful session layer on an ION framework, embodiments of the present disclosure may provide session continuity and/or seamless mobility as the underlying network changes, i.e., irrespective of any IP address change.

Figure 1:
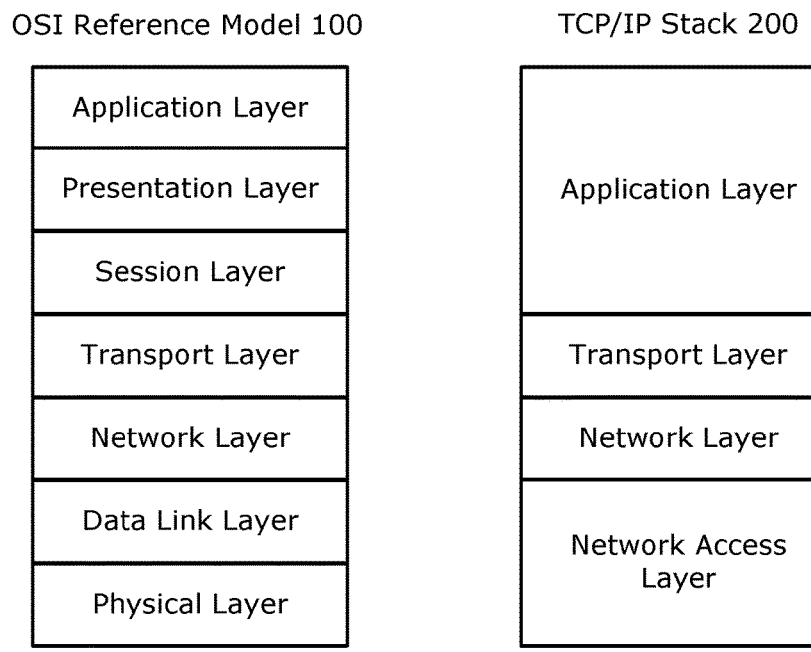
FIG. 1 shows a comparison between the OSI reference model and a conventional TCP/IP model.
Figure 2:
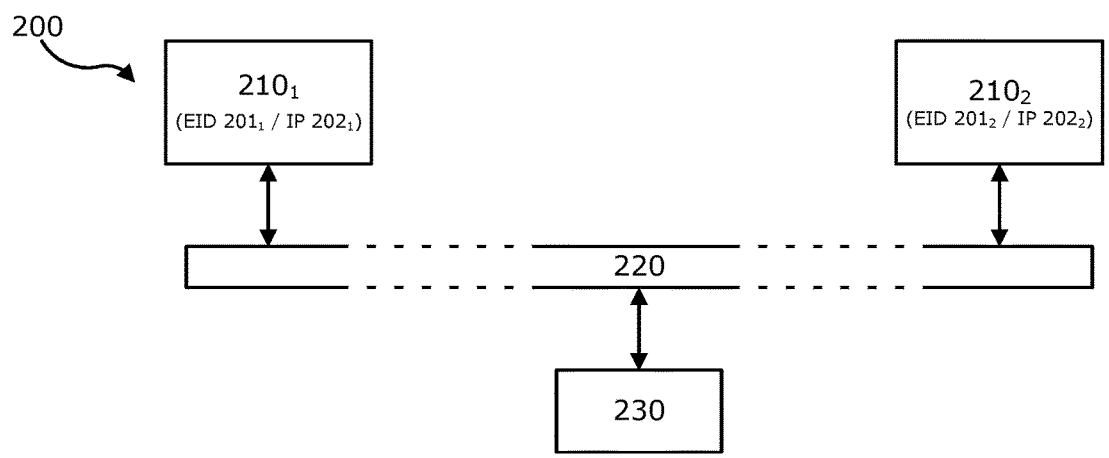
FIG. 2 shows a network architecture for use in an embodiment of the present disclosure.

Embodiments of the present disclosure may be arranged in network topology 200 shown in FIG. 2, where endpoints $210_1$ and $210_2$, as well as mapping system 230, are attached to internet 220. Internet 220 may be any network that supports TCP/IP messages, and may include local area network segments, wide area network segments, packet switch network segments, and the like. Endpoints $210_1$ and $210_2$ may be identified by endpoint identifiers (EIDs) $201_1$ and $201_2$ and by IP addresses $202_1$ and $202_2$. While any given IP address may change according to network topology, an EID uniquely identifies a given endpoint independently of network topology. For example, endpoint $210_1$ may have a first IP address $202_1$ dynamically assigned if it connects to internet 220 from one local network, and a second IP address $202_1'$ if it connects through a different local network; its EID $201_1$, however, will remain fixed irrespective of how it connects to internet 220. Mapping system 230 provides a translation between EIDs and IP addresses, and may be configured as disclosed in U.S. App. No. 62/421,015, which is incorporated by reference in its entirety.

Figure 3:
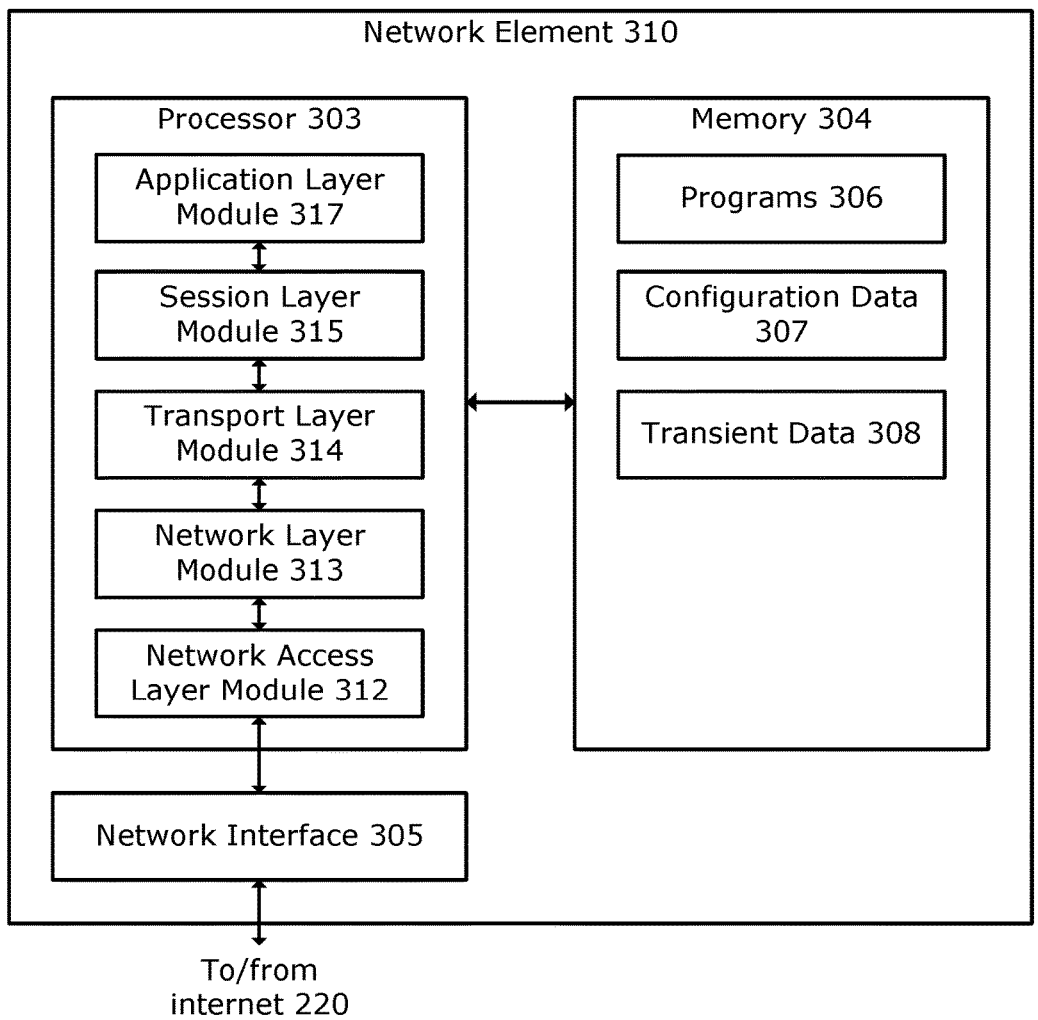
FIG. 3 shows the physical structure of a network element suitable for use as an endpoint in an embodiment of the present disclosure.

In embodiments of the present disclosure, endpoints $210_1$ and $210_2$ may be configured like network element 310, shown in FIG. 3, which is equipped with processor 303, memory 304, and network interface 305. By way of example and not limitation, processor 303 may be a central processing unit, a microcontroller, a digital signal processor, an application specific integrated circuit, multiples and/or combinations of any of the foregoing, or any other device suitable for execution of computer programs. Processor 303 may have discrete modules for implementing the embodiments of the present disclosure, including network access layer module 312, network layer module 313, transport layer module 314, session layer module 315, and application layer module 317. Further, where processor 303 includes multiple components suitable for distributed execution of computer programs, some of modules 312-317 may be executed on multiple components. Memory 304 may include programs 306, configuration data 307, and transient data 308 for use by modules 312-317, and may be dynamic memory, static memory, disk drive(s), flash drive(s), combinations of any of the foregoing, or any other form of computer memory. Network interface 305 may be an Ethernet interface, a wireless interface, or any other physical interface that may be used to connect to a network.

Figure 4:
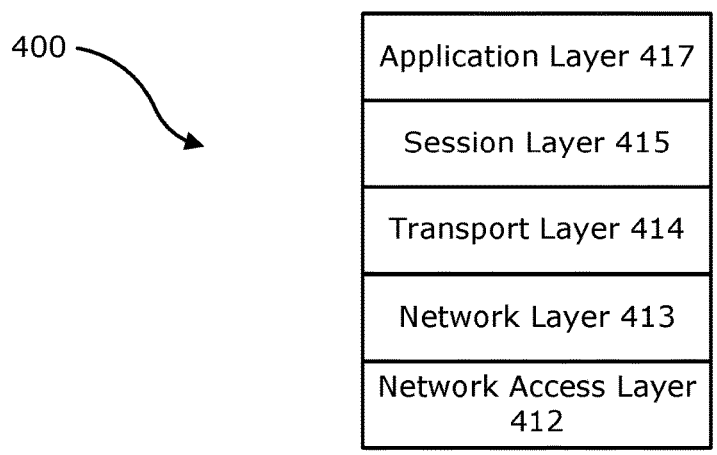
FIG. 4 shows a network layering configuration for use in an embodiment of the present disclosure.

In embodiments of the present disclosure, endpoints $210_1$ and $210_2$ may include layered network architecture 400 as shown in FIG. 4. Layered network architecture 400 includes network access layer 412, network layer 413, transport layer 414, session layer 415, and application layer 417. Network access layer 412 may be implemented using standard protocols such as IEEE 802.3 (Ethernet) or IEEE 802.11 (wireless). Network layer 413 and transport layer 414 may be implemented with TCP/IP. Session layer 415 will be discussed in detail below. Application layer 417 provides a high-level network-related service such as email, file transfer, streaming media, or any other standard or proprietary network application that requires end-to-end session connectivity.

In some embodiments of the present disclosure, there may be a standard interface between application layer 417 and session layer 415. By way of example and not limitation, the interface may include common session-level requests as shown in Table 1:

TABLE 1

| Request | Description |
|---|---|
| Open | Instruct the session layer to open a session layer connection with some remote application. For a client in a client-server configuration (or for a peer requesting a connection to another peer), the application may specify the EID and |

TABLE 1-continued

| Request | Description |
|---|---|
| | service name of the remote application. For a server in a client-server configuration (or a peer that allows connections from other peers), the application may indicate a service name and the session layer will listen for requests for the indicated service, and may also trigger publishing the availability of the service. The session layer may provide a session identifier for use by the application layer. |
| Put | Instruct the session layer to send data to a remote application using an existing session layer connection associated with a given session identifier. |
| Get | Instruct the session layer to receive data from a remote application using an existing session layer connection associated with a given session identifier. |
| Close | Instruct the session layer to close an existing session layer connection associated with a given session identifier. |

Figure 5:
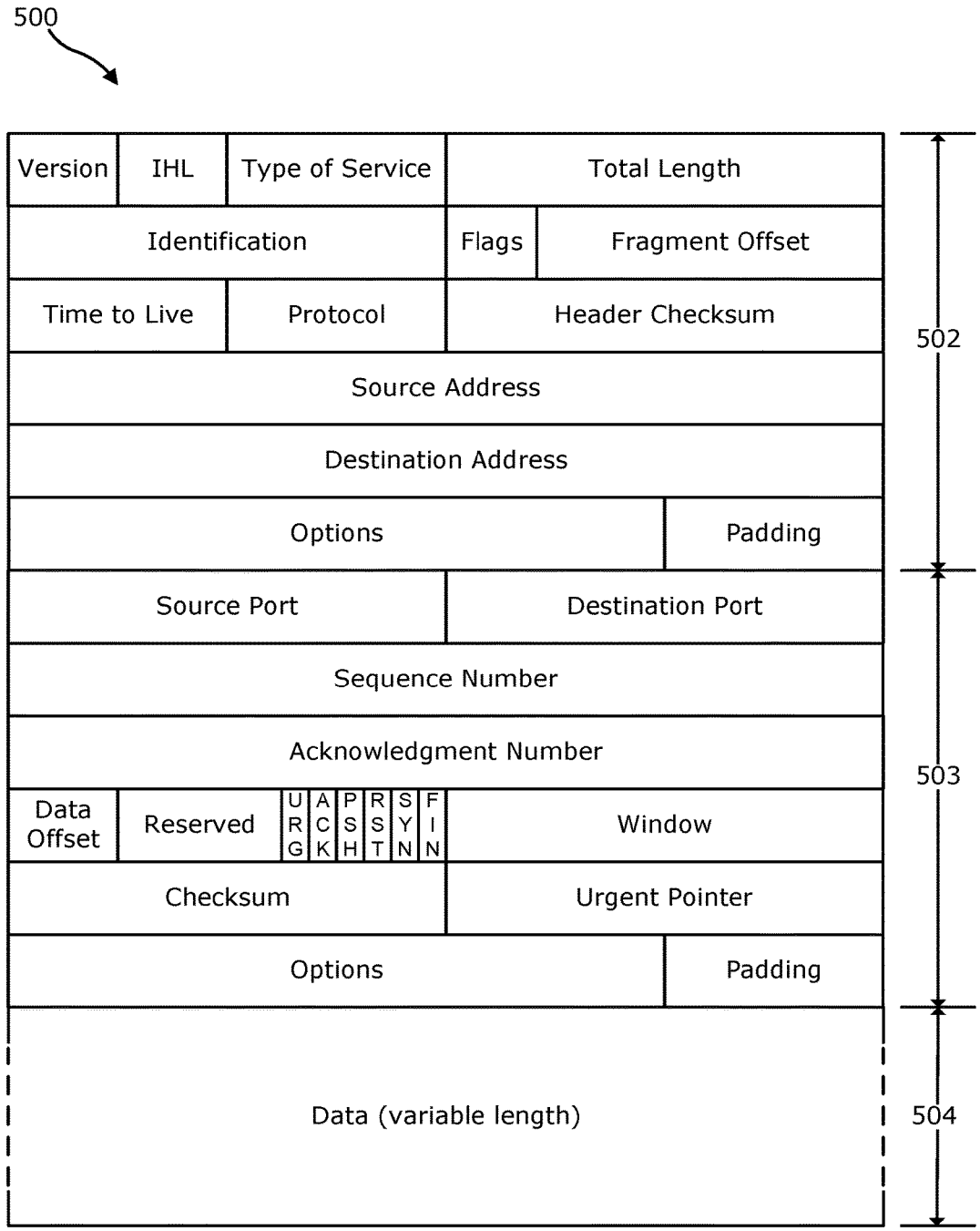
FIG. 5 shows an IP datagram for use in an embodiment of the present disclosure.

In embodiments of the present disclosure, session layer 415 may send and receive messages using standard IP datagrams as shown, for example in FIG. 5, as IP datagram 500 which includes IP header 502, TCP header 503, and data 504. The fields of IP header 502 are described, for example, in RFC 791 ("Internet Protocol DARPA Internet Program Protocol Specification"), and the fields of TCP header 503 are described, for example, in RFC 793 ("Transmission Control Protocol DARPA Internet Program Protocol Specification"), and unless otherwise noted, the embodiments of the present disclosure use the fields of IP header 502 and TCP header 503 according to their ordinary usage. IP datagram 500 in FIG. 5 is in the form of an Internet Protocol version 4 (IPv4) datagram, however, one of ordinary skill will recognize that an Internet Protocol version 6 (IPv6) datagram may be used on a network that supports IPv6.

Figure 6:
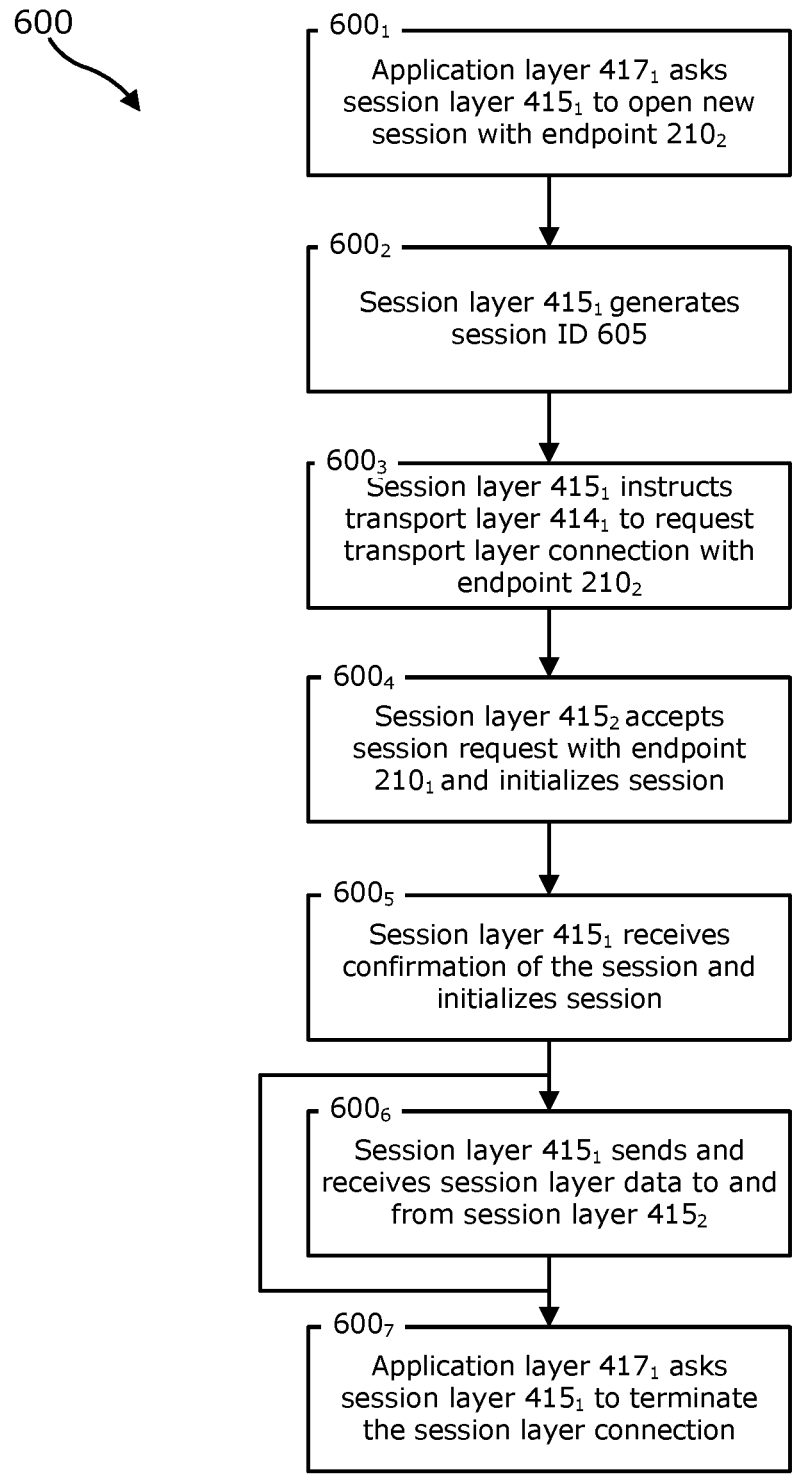
FIG. 6 shows a flowchart for initiating, using, and terminating a session layer connection in an embodiment of the present disclosure.

In a first embodiment of the present disclosure, shown in FIG. 6, endpoint $210_1$ establishes a session with endpoint $210_2$ according to the operations of flowchart 600. Endpoints $210_1$ and $210_2$ may each be implemented with the configuration of network element 310 as shown in FIG. 3 (although endpoints $210_1$ and $210_2$ need not be identical in terms of hardware or software configuration) and be connected to each other and to mapping system 230 via internet 220 as shown in FIG. 2. Prior to the first operation of flowchart 600, endpoint $210_1$ has been configured with EID $201_1$. Further, endpoint $210_1$ may have been configured with a fixed IP address $202_1$, or alternatively it may have received a dynamic IP address $202_1$ from a local router. Additionally, endpoint $210_1$ has registered its EID $201_1$ and IP address $202_1$ with mapping system 230. Similarly, endpoint $210_2$ has also been assigned a fixed or dynamic IP address $202_2$, and has registered its EID $201_2$ and IP address $202_2$ with mapping system 230. Some or all of the initial setup of EIDs and IP addresses may be performed by network layers $413_1$ and $413_2$ (on endpoints $210_1$ and $210_2$ respectively) communicating with mapping system 230.

In operation $600_1$, application layer $417_1$ (i.e., the application layer 417 on endpoint $210_1$) instructs session layer $415_1$ to open a new session with endpoint $210_2$. In making its request, application layer $417_1$ may identify endpoint $210_2$ as EID $201_2$, and it may also request a particular service, such as email, file transfer, and the like, using a name, a numeric identifier, or some other indicator. In addition, application layer $417_1$ may include other session attributes, such as quality of service, timeouts, and other optional settings.

In operation $600_2$, session layer $415_1$ generates a session ID 605. Session ID 605 may be used to identify a particular session layer connection when the session layer is established, during the exchange of data over the session layer connection, when the session layer connection requires synchronization, and when the session layer is terminated. Session ID 605 will not change for the life of the session layer connection. By convention, session ID 605 may be a function of EID $201_1$, EID $201_2$, a numeric identifier for a particular service, session attributes (such as point-to-point, point-to-multipoint, quality-of-service, continuity flag, persistence flag, and so forth), and/or any other identifier that may be useful in differentiating one session from another.

In operation $600_2$, session layer $415_1$ instructs transport layer $414_1$ to request a transport layer connection with endpoint $210_2$ using session ID 605. Depending on implementation, transport layer $414_1$ may resolve EID $201_2$ to its corresponding IP address $202_2$. If endpoint $210_1$ currently has another active session layer connection with endpoint $210_2$, this may involve simply looking up the EID information in local memory; otherwise, it may require sending a request to mapping system 230 over internet 220, and wait for the response back from mapping system 230. Once IP address $202_2$ has been resolved, transport layer $414_1$ inserts IP address $202_2$ into the destination IP address field of IP header 502 in IP datagram 500 and fills in the remainder of the conventional IP and TCP header fields in IP datagram 500 as would be suitable for opening a TCP/IP connection. This may include inserting session ID 605 into an available field in IP datagram 500 (such as the Source Port and/or Destination Port) and uses conventional means to send the open request in IP datagram 500 to endpoint $210_2$. For example, IP datagram 500 may pass through transport layer $414_1$ network layer $413_1$, network access layer $412_1$, and eventually the physical media. Because IP datagram 500 uses conventional IP addresses, the message will be routed through internet 220 to endpoint $210_2$ like any other TCP/IP message.

In operation $600_4$, IP datagram 500 arrives at endpoint $210_2$ where the local operating system receives the message and routes it up through network access layer $412_2$, network layer $413_2$, and transport layer $414_2$. Transport layer $414_2$ may perform additional conventional message exchanges with transport layer $414_1$ to establish the transport layer connection, and then transport layer $414_2$ may inform session layer $415_2$ of the session layer connection request. Session layer $415_2$ may determine the identity of endpoint $210_1$ by extracting EID $201_1$ from session ID 605 (if by convention session ID 605 includes EID $201_1$). Alternatively, session layer $415_2$ (or transport layer $414_2$) may determine the identity of endpoint $210_1$ by querying mapping system 230 according to IP address $202_1$ found in the source IP address field in IP header 502 of IP datagram 500. Session layer $415_2$ may store information about the session layer connection, including session ID 605, EID $201_1$, and any optional settings, and it may also initialize one or more message sequence counters. Session layer $415_2$ may inform application layer $417_2$ of the new session layer connection with endpoint $210_1$. Session layer $415_2$ may send a session connection request confirmation message back to session layer $415_1$.

In operation $600_5$, session layer $415_1$ receives the acknowledgment of the new session layer establishment from session layer $415_2$. Session layer $415_1$ may store information about the session layer connection, including session ID 605, EID $201_2$, and any optional settings, and it may also initialize one or more message sequence counters.

In operation $600_6$, endpoints $210_1$ and $210_2$ may begin exchanging messages using the session layer connection associated with session ID 605. For example, application layer $417_1$ may instruct session layer $415_1$ to send data to endpoint $210_2$. Depending on implementation, session layer $415_1$ may create and populate some or all of IP datagram 500, including data 504, or it may rely on transport layer $414_1$ to populate some or all of IP header 502 and TCP header 503. Session layer $415_1$ then instructs transport layer $414_1$ to send the message to endpoint $210_2$ through the normal operating system interface (i.e., through the transport, network, and network access layers, and to the physical interface to internet 220).

In operation $600_7$, application layer $417_1$ instructs session layer $415_1$ to close the session layer connection associated with session ID 605. Session layer $415_1$ may reuse IP datagram 500 using IP address $202_2$, session ID 605, and an indicator that session layer connection is being terminated normally. Session layer $415_1$ then may then send IP datagram 500 to endpoint $210_2$. Session layer $415_2$, upon receipt of IP datagram 500, may then send an acknowledgment that the session layer connection has been terminated. Session layers $415_1$ and $415_2$ may then terminate the TCP/IP connection using the normal TCP/IP termination message sequence.

One of ordinary skill will recognize that the operations in flowchart 600 may be altered without departing from the spirit of the embodiment. By way of example and not limitation, the following variations may be made to the operations of flowchart 600.

Figure 7:
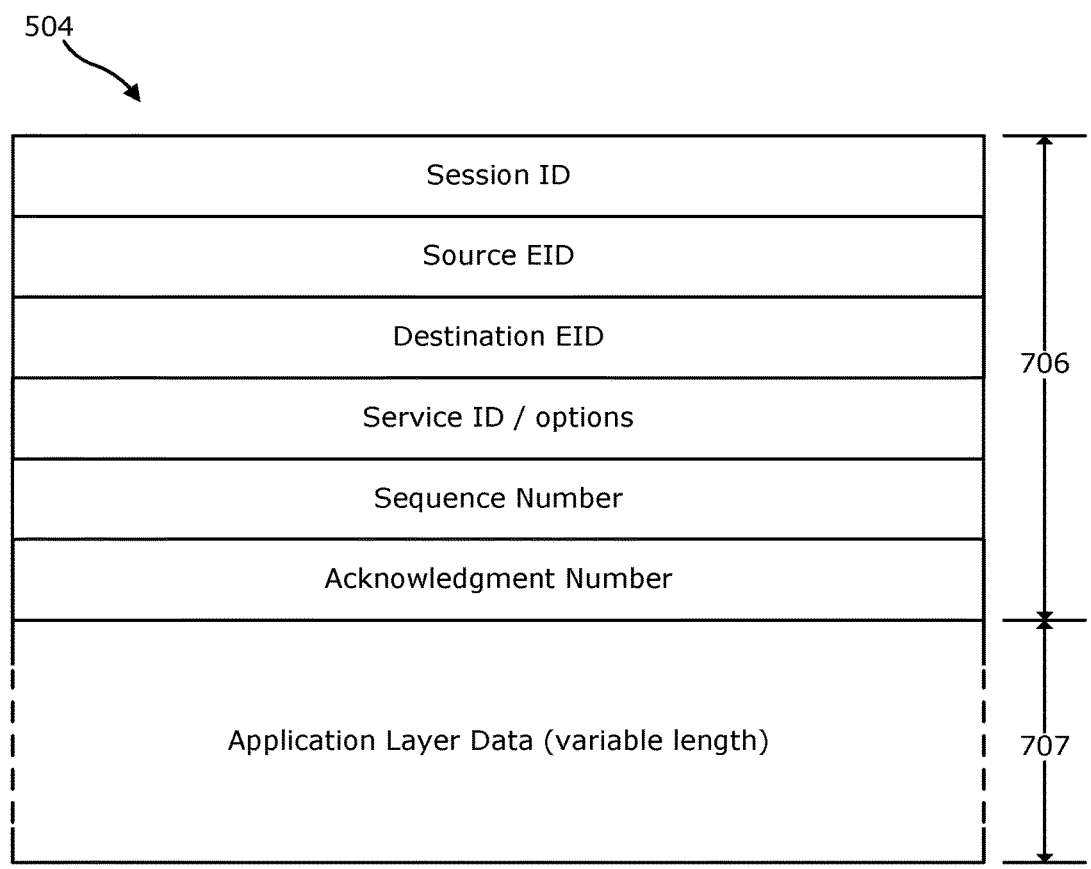
FIG. 7 shows a session header for use in an embodiment of the present disclosure.

In operation $600_3$, session ID 605 may be inserted into the source and/or destination port fields of TCP header 503 of IP datagram 500. In some variations, data 504 in IP datagram 500 may be prefixed with session header 706, as shown in FIG. 7. In this configuration, session ID 605 may be inserted into the session ID field of session header 706, and the remainder of data 504 may be used for any application layer data 707. Further in this configuration, EID $201_1$ and EID $201_2$ may be inserted into the source and destination EID fields of session header 706, and the source and destination port fields of TCP header 503 may be used as in conventional systems (e.g., as an identifier of a particular service).

Further, in operations $600_3$-$600_5$, the session layer connection is established as part of establishing the transport layer connection. In some variations, the transport layer connection may be established first, and then session layers $415_1$ and $415_2$ may negotiate establishment of the session layer connection, for example, by exchanging credential information (name/password, digital certificates, and the like), quality of service requirements, timeout values, requested services, and so forth.

Further, in flowchart 600, endpoint $210_2$ is presumed to be a single endpoint identified by EID $201_2$. In some variations, EID $201_2$ may be associated with multiple endpoints $210_n$, and operation $600_4$ may include creating transport layer connections with each of the endpoints $210_n$, operation $600_5$ may include creating a single session layer connection, which may have a single session ID 605 but which may utilize multiple underlying transport layer connections; in such a configuration, operation $600_6$ may include sending and receiving session layer data over each of the transport layer connections. Further, a single transport layer connection may be used for multiple session layer connections by one or more applications.

Further, in operation $600_6$, endpoints $210_1$ and $210_2$ simply exchange data. In some variations, session layers $415_1$ and $415_2$ may use a message acknowledgment scheme as confirmation that all messages sent by one endpoint have received by the other endpoint. Such an acknowledgment scheme might require an acknowledgment after every message or it might use a sliding window approach as would be known to one of ordinary skill. Session header 706 may include sequence number and acknowledgment number fields in support of the acknowledgment scheme, and session layers $415_1$ and $415_2$ may maintain local counters in order to recognize link errors and manage resynchronization.

Further, in the operations of flowchart 600, session layers $415_1$ and $415_2$ communicate with application layers $417_1$ and $417_2$ respectively. In some variations, there may be a presentation layer between the application and session layers, where the presentation layer may provide for example, data encryption and decryption, data compression and decompression, or transcoding of the data in application layer data 707.

Further, in the operations of flowchart 600, session layer $415_1$ uses TCP/IP to create a transport layer connection between endpoints $210_1$ and $210_2$ In some variations, session layer $415_1$ may create a session layer connection by using user datagram protocol (UDP) messages or by directly accessing a lower layer communication protocol associated with Bluetooth®, Wi-Fi®, ZigBee®, or other personal area networks. Such an implementation may be useful for implementing session layers between devices which do not require a full TCP/IP stack, such as internet-of-things (IoT) devices.

Further, the Service ID/options field of session header 706 may be used to identify a particular service, such as email or file transfer; in some variations, the service may be identified by name while in other variations, it may be identified by a number. In some variations, this field may indicate quality of service requirements, timeout values, and/or or operational characteristics. In some variations, it may be used to distinguish between a lossless connection (which may require buffering of messages to allow resynchronization after a disruption of the session) or a real-time connection (such as audio or video streaming which may not require resynchronization after a disruption of the session).

Further, as would be understood by one of ordinary skill in the art, the fields in session header 706 suggested by FIG. 7 are exemplary, and an implementation of the embodiments of this disclosure may include some or all of these fields and may include other fields not shown in FIG. 7. Further, no conclusions should be drawn regarding the sizes of the various fields shown in session header 706; for example, the "Session ID" and "Source EID" are shown to be the same size, however, in practice, the fields may be the same size or different sizes. Further, as suggested by FIG. 7, session header 706 is part of data 504. Alternatively, session header 706 may be a part of the options field in TCP header 503.

Figure 8:
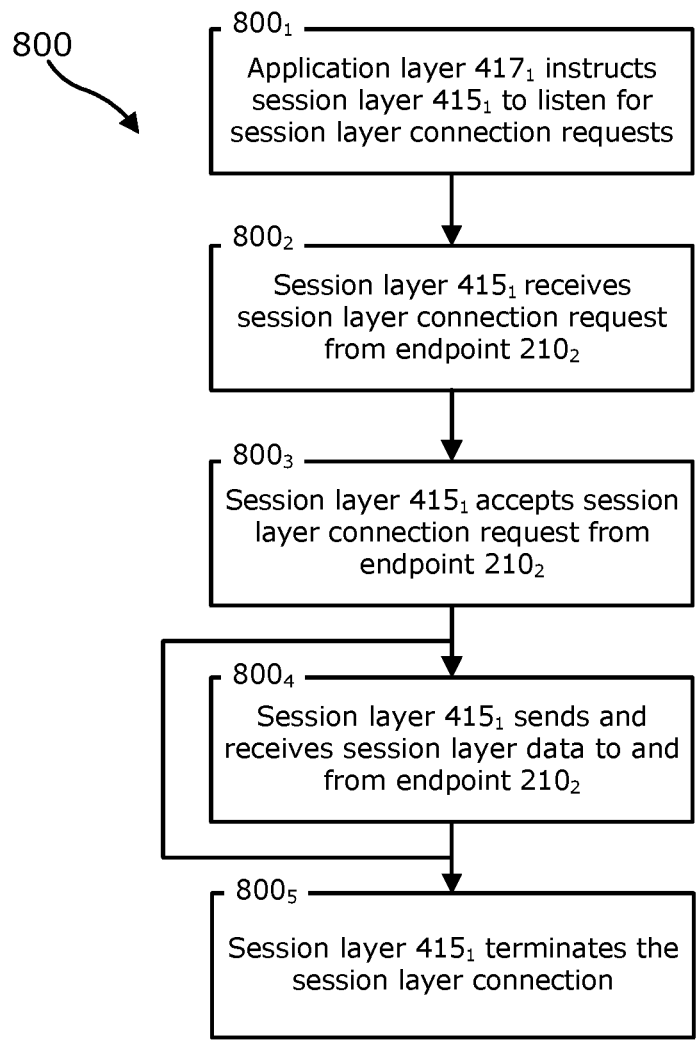
FIG. 8 shows a flowchart for receiving a request for and then using a session layer in an embodiment of the present disclosure.

FIG. 8 shows another embodiment of the present disclosure, and may be a counterpart for the embodiment of flowchart 600. Again, endpoints $210_1$ and $210_2$ may each be implemented with the configuration of network element 310 as shown in FIG. 3 (although endpoints $210_1$ and $210_2$ need not be identical in terms of hardware or software configuration) and be connected to each other and to mapping system 230 via internet 220 as shown in FIG. 2. As described by flowchart 800, a first endpoint $210_1$ acting as a server establishes a session layer connection with a second endpoint at the request of the second endpoint acting as a client. As with flowchart 600, prior to the first operation of flowchart 800, endpoint $210_1$ has been configured with an EID $201_1$ Further, endpoint $210_1$ may have been configured with a fixed assigned IP address $202_1$, or alternatively it may have received a dynamic IP address $202_1$ from a local router. Additionally, endpoint $210_1$ has registered its EID $201_1$ and IP address $202_1$ with mapping system 230. Similarly, endpoint $210_2$ has also been assigned a fixed or dynamic IP address $202_2$, and has registered its EID $201_2$ and IP address $202_2$ with mapping system 230. Some or all of the initial setup of EIDs and IP addresses may be performed by network layers $413_1$ and $413_2$ (on endpoints $210_1$ and $210_2$ respectively) communicating with mapping system 230.

In operation $800_1$, application layer $417_1$ instructs session layer $415_1$ to listen for session layer connection requests for an identified service. In response, session layer $415_1$ may instruct transport layer $414_1$ to listen for TCP/IP connection requests.

In operation $800_2$, transport layer $414_1$ reports to session layer $415_1$ that it has received a transport layer connection request from endpoint $210_2$. Transport layer $414_1$ may provide information about the transport layer connection request in the form of IP datagram 500. IP datagram 500 may also include a session layer connection request, including a session ID 805. Session layer $415_1$ may determine the identity of endpoint $210_2$ by extracting EID $201_2$ from session ID 805 (if, by convention, session ID 805 includes EID $201_2$). Session layer $415_1$ may store information about the session layer connection, including session ID 805, EID $201_2$, and any optional settings, and it may also initialize one or more message sequence counters.

In operation $800_3$, session layer $415_1$ accepts the session layer connection request from endpoint $210_2$. Session layer $415_1$ may inform application layer $417_1$ of the new session layer connection with endpoint $210_2$, it may instruct transport layer $415_1$ to accept the transport layer connection with endpoint $210_2$, and it may instruct transport layer $415_1$ to send a session connection request confirmation message back to endpoint $210_2$.

In operation $800_4$, endpoints $210_1$ and $210_2$ may begin exchanging messages using the session layer connection associated with session ID 805. For example, endpoint $210_2$ may send an application layer data request to endpoint $210_1$. The data request may arrive at session layer $415_1$ as IP datagram 500 via the physical interface to internet 220 and through the network access, network, and transport layers; session layer $415_1$ may then extract the data request from IP datagram 500 and forward the data request to application layer $417_1$. In response, application layer $417_1$ may instruct session layer $415_1$ to send the requested data back to endpoint $210_2$, and session layer $415_1$ then sends the data to endpoint $210_2$ through the normal operating system interface (i.e., through the transport, network, and network access layers, and to the physical interface to internet 220).

In operation $800_6$, application layer $417_1$ instructs session layer $415_1$ to close the session layer connection associated with session ID 805. Session layer $415_1$ may reuse IP datagram 500 using IP address $202_2$, session ID 805, and an indicator that session layer connection is being terminated normally. Session layer $415_1$ then may then send IP datagram 500 to endpoint $210_2$. Session layer $415_2$, upon receipt of IP datagram 500, may then send an acknowledgment that the session layer connection has been terminated. Session layers $415_1$ and $415_2$ may then terminate the TCP/IP connection using the normal TCP/IP termination message sequence.

One of ordinary skill will recognize that the operations in flowchart 800 may be altered without departing from the spirit of the embodiment. By way of example and not limitation, the following variations may be made to the operations of flowchart 800.

In operation $800_1$, transport layer $414_1$ may translate an identified service into the port number used to listen for the TCP/IP connection request. In some variations, this may be implemented by looking up the identified service in a database translating services into port numbers. In other variations, application layer $417_1$ may provide the port number directly. In other variations, session layer $415_1$ may use a port number associated with a general purpose session layer manager service and insert the port number into the service ID field in session header 706.

Further, in operation $800_1$, transport layer $414_1$ may listen for incoming connection requests from any remote endpoint; this might be suitable if application layer $417_1$ is a server that allows multiple connections. In some variations, transport layer $414_1$ may listen for incoming connection requests from a single specific (or non-specific) remote endpoint; this might be suitable for peer-to-peer sessions.

Further, in operation $800_1$, application layer $417_1$ instructs session layer $415_1$ to listen for session layer connection requests for an identified service, but does not specify any further limitations on connections. In some variations, application layer $417_1$ may limit session layer connection requests to a specified endpoint or list of endpoints, in which case in operation $800_2$, session layer $415_1$ may reject any requests coming from any other endpoint. Further, in some variations, session layer $415_1$ may negotiate establishment of the session layer connection, for example, by exchanging credential information, quality of service requirements, timeout values, requested services, and so forth, and may reject session layer connection requests because of invalid credentials, unauthorized users, inadequate network resources to meet the requested quality of service, and so forth.

Further, the variations discussed in conjunction with flowchart 600 are generally applicable to the operations of flowchart 800. Further, in some variations, session layer $415_1$ may be configured to implement both the operations of flowchart 600 and flowchart 800. In other variations, session layer $415_1$ may only be configured to provide the operations of one or the other. In other variations, session layer $415_1$ may be specifically configured for operation as either a server or a client in a client-server-service architecture or as a peer in a peer-to-peer architecture.

Figure 9:
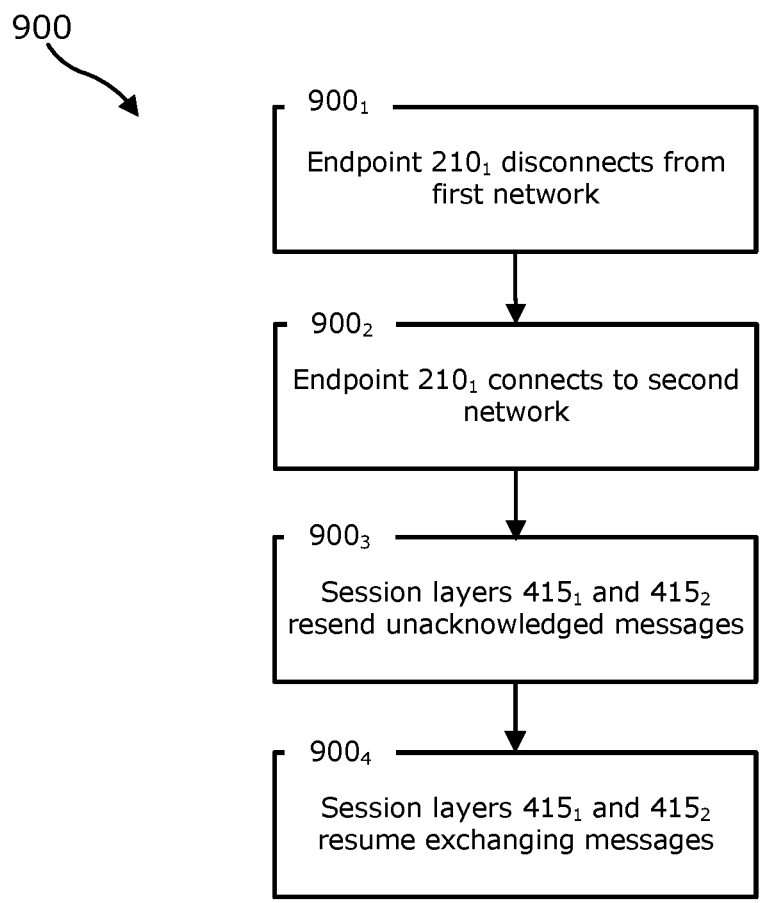
FIG. 9 shows a flowchart of for resynchronizing a session layer connection in a client-oriented embodiment of the present disclosure.

FIG. 9 shows a session layer connection recovery sequence from the perspective of the endpoint which initiated the link (for example, the embodiment of flowchart 600). Again, endpoints $210_1$ and $210_2$ may each be implemented with the configuration of network element 310 as shown in FIG. 3 (although endpoints $210_1$ and $210_2$ need not be identical in terms of hardware or software configuration) and be connected to each other and to mapping system 230 via internet 220 as shown in FIG. 2. As described by flowchart 900, in this embodiment, the transport layer connection between endpoints $210_1$ and $210_2$ disconnects abruptly. When endpoints $210_1$ and $210_2$ reestablish the transport layer connection, session layers $415_1$ and $415_2$ resynchronize so that no data is lost and application layers $417_1$ and $417_2$ may be unaware of the disruption of the transport layer connection.

Prior to the first operation of flowchart 900, a session layer connection between endpoint $210_1$ and $210_2$ has been established using the operations described in flowchart 600, and session layers $415_1$ and $415_2$ are exchanging messages. Initially, endpoint $210_1$ is connected to internet 220 via a first local network (for example, a wireless local area network). As session layers $415_1$ and $415_2$ send and receive messages, each maintains sequence number 906 indicating the sequence number of the last message each has sent to the other, and each maintains acknowledgment number 907 indicating the sequence number of the last message acknowledged by the other. For purposes of explaining this embodiment, assume that session layer $415_1$ has sent message sequence numbers 0-100 and has received acknowledgments for message sequence numbers 0-95; that is, assume sequence number $906_1$ is 100 and acknowledgment number $907_1$ is 95. Similarly, assume that session layer $415_2$ has sent message sequence numbers 200-300 and has received acknowledgments for message sequence numbers 200-295; that is, assume sequence number $906_2$ is 200 and acknowledgment number $907_2$ is 295. Finally, assume that the session layer connection has been assigned session ID 905, endpoints $210_1$ and $210_2$ have been assigned EIDs $201_1$ and $201_2$ respectively, and have been dynamically assigned IP addresses $202_1$ and $202_2$ respectively.

In operation $900_1$, endpoint $210_1$ has disconnected from its first network connection to internet 220; for example, it may have moved outside of the range of its wireless local area network. Transport layer $414_1$ may send an error message to session layer $415_1$ indicating that the transport layer connection has unexpectedly terminated.

In operation $900_2$, endpoint $210_1$ has rejoined internet 220 through a second network connection, for example, by connecting through a fourth generation long term evolution (LTE) network, which may result in assignment of a new IP address $202_1'$ to endpoint $210_1$. The underlying network layers $413_1/413_2$ and/or transport layers $414_1/414_2$ may reestablish the underlying connection.

In operation $900_3$, session layer $415_1$ receives a session resynchronization request from $415_2$. The request will use the same session ID 905, thus, when session layer $415_1$ will recognize the message as part of an established session layer connection. Session layer $415_1$ examines sequence number $906_1$ and acknowledgment number $907_1$ and determines it needs to resend messages for message sequence number 96-100. Similarly, session layer $415_1$ may send a session resynchronization request to session layer $415_2$, which will examine sequence number $906_2$ and acknowledgment number $907_2$ and determines it needs to resend messages for message sequence number 296-300.

In operation $900_4$, session layers $415_1$ and $415_2$, having resynchronized, may continue exchanging messages using the session layer connection associated with session ID 905. Even though the physical connection has been broken, requiring new connections at the transport, network, and network access layers, the session layer connection associated with session ID 905 remains intact, and application layers $417_1$ and $417_2$ may never know about the underlying disconnect, reconnect, and resynchronization events managed by session layers $415_1$ and $415_2$.

One of ordinary skill will recognize that the operations in flowchart 900 may be altered without departing from the spirit of the embodiment. By way of example and not limitation, the following variations may be made to the operations of flowchart 900.

In operation $900_1$, transport layer $414_1$ informs session layer $415_1$ learned that the underlying transport layer connection had been broken. In some variations, this may have occurred asynchronously when a lower layer recognized the loss of the connection, or it may have occurred synchronously when a lower layer returned an error code in response to a send or receive request. Alternatively, session layers $415_1$ and $415_2$ may have agreed on a periodic exchange of "heartbeat" messages, and session layer $415_1$ may have recognized link failure when it failed to receive a scheduled heartbeat message from session layer $415_2$. Alternatively, transport layer $414_1$ may hide the loss and reestablishment of the transport layer connection from session layer $415_1$ altogether. Further, session layer $415_1$ may hide the loss and reestablishment of the transport layer connection from application layer $417_1$.

Further, in operation $900_1$, the transport layer connection may terminate when endpoint $210_1$ changes its IP address, for example because it has moved from one network to another. In other variations, the link may have been momentarily disconnected because of a failure in the service provider network, while in other variations, both endpoints $210_1$ and $210_2$ may have moved to other networks. Alternatively, one of the session layers may have purposefully disconnected the transport layer connection if it found that quality of service has degraded below a minimum value, and another physical link is available (for example, when both wired and wireless links are available). In any case, so long as session layers $415_1$ and $415_2$ remain active (or have retained sufficient session layer information for a graceful restart), the session layer connection associated with session ID 905 can be restarted and resynchronized irrespective of any IP address changes.

Further, in operation $900_2$, if endpoint $210_1$ has moved to another network, after establishing a new connection with the new network, session layer $415_1$ (or a lower layer on endpoint $210_1$) may send an update to mapping system 230 so that it has the current ED to IP address mappings.

Further, in operation $900_3$, the session layer connection may immediately begin resynchronization when session layer $415_1$ sends a session layer message to session layer $415_2$ using session ID 905. In other variations, session layers $415_1$ and $415_2$ may perform additional handshaking such as re-exchanging credentials and/or re-confirming the EID and IP addresses with mapping system 230.

Further, in operation $900_3$, session layers $415_1$ and $415_2$ may send resynchronization request messages to initiate the resending of lost messages. In other variations, session layers $415_1$ and $415_2$ may recognize the need to resynchronize without an express request; instead, session layers $415_1$ and $415_2$ may infer the need to resynchronize by examination of the sequence numbers $906_1/906_2$ and acknowledgment numbers $907_1/907_2$.

Further, the embodiment shown in flowchart 900 assumes that resynchronization of the session is necessary. For example, if a session is used for downloading a file, then in case of a disruption of the session, resynchronization will ensure that the entire file is properly downloaded. If, however, a session is used, for example, to stream video from a live event, then resending loss frames from the streaming video may be less important than maintaining the timely video feed. In some variations, session layers $415_1$ and $415_2$ may agree on resynchronization parameters such as whether or not to save unacknowledged messages for possible resynchronization and/or how many unacknowledged messages to save.

Further, any of the variations relating to flowcharts 700 and 800 may apply to flowchart 900 operations.

Figure 10:
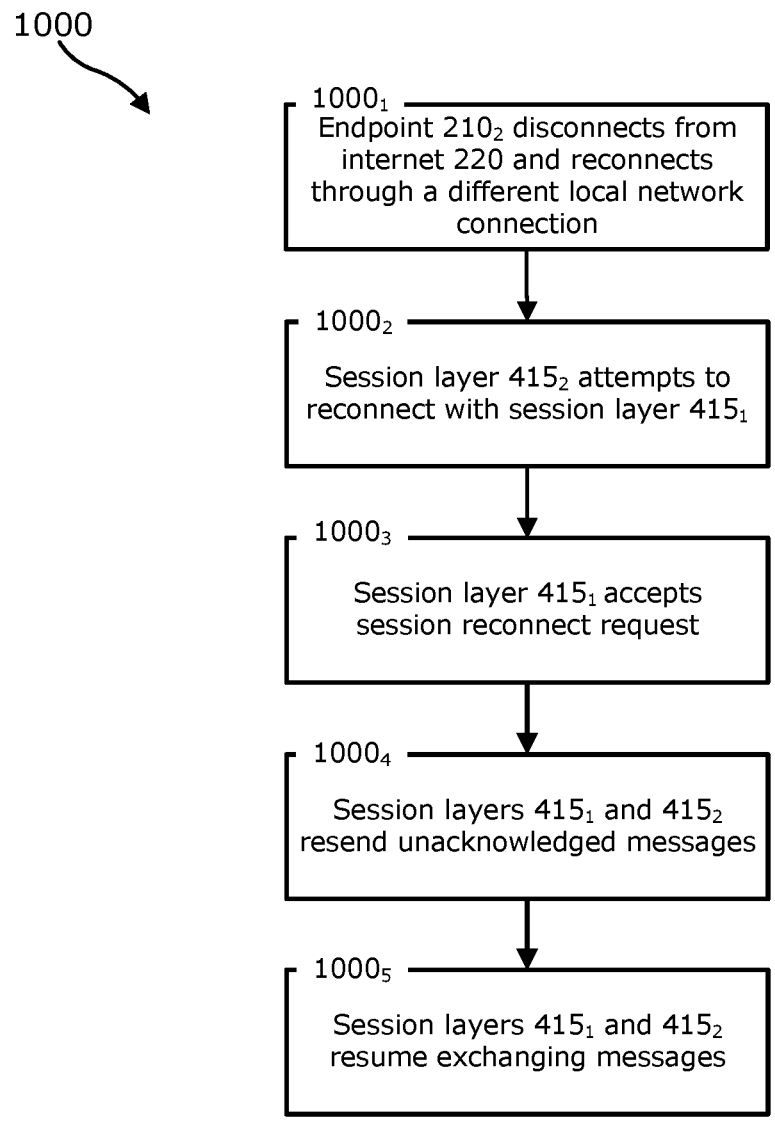
FIG. 10 shows a flowchart of for resynchronizing a session layer connection in a server-oriented embodiment of the present disclosure.

Flowchart 1000 of FIG. 10 describes a session layer connection recovery sequence similar to flowchart 900 except from the perspective of an endpoint which did not initiate the session (for example, the embodiment of flowchart 800). Again, endpoints $210_1$ and $210_2$ may each be implemented with the configuration of network element 310 as shown in FIG. 3 (although endpoints $210_1$ and $210_2$ need not be identical in terms of hardware or software configuration) and be connected to each other and to mapping system 230 via internet 220 as shown in FIG. 2. As described by flowchart 1000, in this embodiment, the transport layer connection between endpoints $210_1$ and $210_2$ disconnects abruptly. When endpoints 210₁ and 210₂ reestablish the transport layer connection, session layers 415₁ and 415₂ resynchronize so that no data is lost and application layers 417₁ and 417₂ may be unaware of the disruption of the transport layer connection.

Prior to the first operation of flowchart 1000, a session layer connection between endpoint 210₁ and 210₂ has been established using the operations described in flowchart 800, and session layers 415₁ and 415₂ are exchanging messages. As session layers 415₁ and 415₂ send and receive messages, each maintains sequence number 1006 indicating the sequence number of the last message each has sent to the other, and each maintains acknowledgment number 1007 indicating the sequence number of the last message acknowledged by the other. For purposes of explaining this embodiment, assume that session layer 415₁ has sent message sequence numbers 0-100 and has received acknowledgments for message sequence numbers 0-95; that is, assume sequence number 1006₁ is 100 and acknowledgment number 1007₁ is 95. Similarly, assume that session layer 415₂ has sent message sequence numbers 200-300 and has received acknowledgments for message sequence numbers 200-295; that is, assume sequence number 1006₂ is 200 and acknowledgment number 1007₂ is 295. Further, assume that the session layer connection has been assigned session ID 1005, endpoints 210₁ and 210₂ have been assigned EIDs 201₁ and 201₂ respectively, and have been dynamically assigned IP addresses 202₁ and 202₂ respectively. Finally, assume that session layer 415₁ has instructed transport layer 414₁ to continue to listen for new transport layer connection requests from other endpoints.

In operation 1000₁, the local network connection between endpoint 210₂ and internet 220 breaks (for example, endpoint 210₂ may have moved outside of the range of a wireless local area network). Although this may result in disconnection of the transport layer connection between endpoint 210₁ and endpoint 210₂, session layer 415₁ may not immediately be aware of the failure. At some point, endpoint 210₂ may reestablish a connection to internet 220 through a second network connection, for example, an LTE network, which may result in assignment of a new IP address 202₂' to endpoint 210₂). Endpoint 210₂, via session layer 415₂, may then initiate reconnecting the transport and session layer connections as described in flowchart 900.

In operation 1000₂, transport layer 414₁ receives the transport layer connection request from endpoint 210₂. The request may indicate a different IP address for endpoint 210₂ (IP address 202₂') but the same session ID (session ID 1005). In operation 1000₃, session layer 415₁, upon receipt of the transport layer connection request, may recognize this as a request to resynchronize the session layer connection between endpoint 210₁ and 210₂, and accepts the transport layer connection request.

In operation 1000₄, session layer 415₁ examines sequence number 1006₁ and acknowledgment number 1007₁ and determines it needs to resend messages for message sequence number 96-100. Similarly, session layer 415₂ examines sequence number 1006₂ and acknowledgment number 1007₂ and determines it needs to resend messages for message sequence number 296-300. In operation 1000₅, session layers 415₁ and 415₂, having resynchronized, may continue exchanging messages using the session layer connection associated with session ID 1005.

One of ordinary skill will recognize that the operations in flowchart 1000 may be altered without departing from the spirit of the embodiment. By way of example and not limitation, the variations disclosed for flowcharts 700, 800, and 900 may apply to the operations of flowchart 1000 as well.

Thus disclosed herein is a method for establishing a session layer connection between a a first network element identified by a first EID and a second network element identified by a second EID, the method having a means for receiving a request from an application layer to listen for a session layer connection request, wherein the application layer is associated with the first network element, a means for instructing a transport layer to listen for a request for a new transport layer connection, wherein the transport layer is associated with the first network element, a means for receiving a first transport layer connection request from the second network element, wherein the transport layer connection request comprises a first IP address, a means for establishing a first transport layer connection with the second network element, a means for receiving a first session layer connection request from the second network element, wherein the first session layer connection request comprises a session ID and the second EID, and a means for establishing a session layer connection with the second network element.

Further disclosed herein is a method for establishing a session layer connection between a first network element identified by a first EID with a second network element identified by a second EID, the method having a means for receiving a request from an application layer to establish a new session layer connection, wherein the request comprises the second EID and wherein the application layer is associated with the first network element, a means for translating the second EID into a second internet protocol IP address associated with the second network element, a means for generating a session ID, wherein the session ID uniquely identifies the session layer connection, a means for instructing a transport layer to establish a transport layer connection with the second network element according to a first IP address identifying the first network element and the second IP address, wherein the transport layer is associated with the first network element, and a means for establishing the session layer connection with the second network element using the transport layer connection and the session D.

Further disclosed herein is a first network element identified by a first EID having a means for storing programming logic to implement an application layer, a session layer, a transport layer, a network layer, and a network access layer, a means for communicating with a second network element via an internet, a means for receiving a request from the application layer to listen for a session layer connection request, a means for instructing the transport layer to listen for a request for a new transport layer connection, a means for receiving a transport layer connection request, via the network interface, from the second network element identified by a second EID, a means for establishing a transport layer connection, via the network interface, with the second network element, a means for receiving a session layer connection request, via the network interface, from the second network element, wherein the session layer connection request comprises a session ID, and a means for establishing a session layer connection, via the network interface, with the second network element.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A method for a first network element to establish a session layer connection with a second network element, the method comprising:
receiving a request from an application layer of the first network element to listen for a session layer connection request, wherein the first network element is identified by a first endpoint identifier (EID);
instructing a transport layer of the first network element to listen for a request for a new transport layer connection;
receiving a first transport layer connection request from the second network element, wherein the first transport layer connection request comprises a first internet protocol (IP) address and wherein the second network element is identified by a second EID;
establishing a first transport layer connection with the second network element;
receiving a first session layer connection request from the second network element, wherein the first session layer connection request comprises a session identifier (ID) and the second EID;
establishing a session layer connection with the second network element;
receiving a first plurality of session layer messages from the second network element via the session layer connection;
forwarding the first plurality of session layer messages to the application layer;
receiving a second plurality of session layer messages from the application layer with instructions to send the second plurality of session layer messages to the second network element;
sending the second plurality of session layer messages to the second network element via the session layer connection;
maintaining a local message sequence number associated with the session layer connection;
inserting the local message sequence number into each of the second plurality of session layer messages;
incrementing the local message sequence number after sending each session layer message;
maintaining a local message acknowledgement number associated with the session layer connection; and
updating the local message acknowledgement number according to a received message acknowledgement number extracted from each of the first plurality of session layer messages.

2. The method of claim 1, wherein establishing the session layer connection further comprises sending a session layer confirmation message to the second network element via the first transport layer connection.

3. The method of claim 1, wherein establishing the session layer connection further comprises:
receiving credential information from the second network element via the first transport layer connection; and
authenticating the credential information.

4. The method of claim 1, further comprising:
receiving a second transport layer connection request from the second network element, wherein the second transport layer connection request comprises the first IP address;
establishing a second transport layer connection with the second network element;
receiving a second session layer resynchronization request from the second network element, wherein the second session layer resynchronization request comprises the session ID and the second EID;
reestablishing the session layer connection with the second network element; and
resynchronizing the session layer connection according to the local message sequence number and the local message acknowledgement number.

5. The method of claim 1, further comprising:
receiving a second transport layer connection request from the second network element, wherein the second transport layer connection request comprises a second IP address;
establishing a second transport layer connection with the second network element;
receiving a second session layer resynchronization request from the second network element, wherein the second session layer resynchronization request comprises the session ID and the second EID;
reestablishing the session layer connection with the second network element; and
resynchronizing the session layer connection according to the local message sequence number and the local message acknowledgement number.

6. The method of claim 1, wherein each of the first plurality of session layer messages comprises a session header and wherein the session header comprises the session ID, the first EID, the second EID, a message sequence number and a message acknowledgement number.

7. A first network element comprising:
a memory for storing programming logic to implement an application layer, a session layer, a transport layer, a network layer, and a network access layer;
a network interface coupled with a second network element via an internet, wherein the first network element is identified on the internet by a first endpoint identifier (EID) and wherein the second network element is identified on the internet by a second EID; and
a processor coupled to the memory and the network interface, wherein the processor is configured to:
receive a request from the application layer of the first network element to listen for a session layer connection request;
instruct the transport layer of the first network element to listen for a request for a new transport layer connection;
receive a transport layer connection request, via the network interface, from the second network element;
establish a transport layer connection, via the network interface, with the second network element;
receive a session layer connection request, via the network interface, from the second network element, wherein the session layer connection request comprises a session identifier (ID);
establish a session layer connection, via the network interface, with the second network element;
receive a first plurality of session layer messages from the second network element via the session layer connection; each of the first plurality of session layer messages comprising a session header, the session header including the session ID, the first EID, the second EID, a message sequence number, and a message acknowledgement number;
forward the first plurality of session layer messages to the application layer of the first network element;

receive a second plurality of session layer messages from the application layer of the first network element with instructions to send the second plurality of session layer messages to the second network element; and send the second plurality of session layer messages to the second network element via the session layer connection.

8. The first network element of claim 7, wherein the memory comprises a local message sequence number and a local message acknowledgement number and wherein the processor is further configured to:

insert the local message sequence number into each of the second plurality of session layer messages;

increment the local message sequence number after sending each session layer message; and update the local message acknowledgement number according to a receive message acknowledgement number extracted from each of the first plurality of session layer messages.

9. The first network element of claim 8, wherein the processor is further configured to:

receive a second transport layer connection request from the second network element, wherein the second transport layer connection request comprises a first internet protocol (IP) address;

establish a second transport layer connection with the second network element;

receive a second session layer resynchronization request from the second network element, wherein the second session layer resynchronization request comprises the session ID and the second EID;

reestablish the session layer connection with the second network element; and resynchronize the session layer connection according to the local message sequence number and the local message acknowledgement number.

10. The first network element of claim 8, wherein the processor is further configured to:

receive a second transport layer connection request from the second network element, wherein the second transport layer connection request comprises a second internet protocol (IP) address;

establish a second transport layer connection with the second network element;

receive a second session layer resynchronization request from the second network element, wherein the second session layer connection request comprises the session ID and the second EID;

reestablish the session layer connection with the second network element; and resynchronize the session layer connection according to the local message sequence number and the local message acknowledgement number.

* * * * *